United States Patent
Mattejat et al.

(10) Patent No.: US 7,282,281 B2
(45) Date of Patent: Oct. 16, 2007

(54) METHOD FOR RECOGNITION OF A LEAK IN A FUEL CELL

(75) Inventors: Arno Mattejat, Bubenreuth (DE); Ottmar Voitlein, Lonnerstadt (DE)

(73) Assignee: Siemens Aktiengesellschaft, Munich (DE)

( * ) Notice: Subject to any disclaimer, the term of this patent is extended or adjusted under 35 U.S.C. 154(b) by 321 days.

(21) Appl. No.: 10/433,900

(22) PCT Filed: Nov. 27, 2001

(86) PCT No.: PCT/DE01/04453

§ 371 (c)(1),
(2), (4) Date: Jul. 2, 2003

(87) PCT Pub. No.: WO02/47189

PCT Pub. Date: Jun. 13, 2002

(65) Prior Publication Data

US 2005/0003245 A1 Jan. 6, 2005

(30) Foreign Application Priority Data

Dec. 6, 2000 (DE) ................ 100 60 626

(51) Int. Cl.
- *H01M 8/00* (2006.01)
- *H01M 8/04* (2006.01)
- *G01M 3/04* (2006.01)
- *G01N 25/72* (2006.01)

(52) U.S. Cl. ............... 429/12; 429/23; 429/13; 73/40; 374/4

(58) Field of Classification Search ........... 429/13, 429/12, 23, 22, 25; 73/40, 40.5 P, 112, 115, 73/865.9; 702/58, 64; 374/4
See application file for complete search history.

(56) References Cited

U.S. PATENT DOCUMENTS 6,087,033 A 7/2000 Grüne et al.

(Continued)

FOREIGN PATENT DOCUMENTS

DE 19649434 1/1998

(Continued)

OTHER PUBLICATIONS

Shuichi; "Detection Method for Interpole Gas Leak and Permeation for Unit Cell of Fuel Cell";European Patent Office Patent; Patent Abstracts of JAPAN; JP 08185879; © 1996.

(Continued)

*Primary Examiner*—Raymond Alejandro
(74) *Attorney, Agent, or Firm*—Harness, Dickey & Pierce, P.L.C.

(57) ABSTRACT

A leak in the membrane of a fuel cell leads to an uncontrolled and heat-generating reaction which can destroy the fuel cell. A method for recognition of a leak in a fuel cell is disclosed which leads to an automatic closing down of the fuel cell without a safety device. The anode gas chamber of the fuel cell is treated with a first test gas and the cathode gas chamber of the fuel cell is treated with a second test gas. The cell voltage of the fuel cell measured and the change with time in the cell voltage is monitored. A gas with a hydrogen content of 0.1 to 20 vol. % is used as first test gas and a gas with an oxygen content of 0.1 to 30 vol. % is used as second test gas.

12 Claims, 1 Drawing Sheet

U.S. PATENT DOCUMENTS 6,156,447 A     12/2000  Bette et al.
6,461,751 B1 *  10/2002  Boehm et al. ................. 429/13
6,638,650 B1 *  10/2003  Bailey et al. ................. 429/13

FOREIGN PATENT DOCUMENTS

| | | |
|---|---|---|
| JP | 5-502973 | 5/1993 |
| JP | 09-027336 * | 1/1997 |
| JP | 10-509839 | 9/1998 |
| JP | 11-40181 | 2/1999 |
| WO | WO91/19328 | 12/1991 |

OTHER PUBLICATIONS

Japanese Office Action dated Jan. 11, 2007 (with translation) for corresponding Japanese Patent Application No. 2002-548805.

* cited by examiner

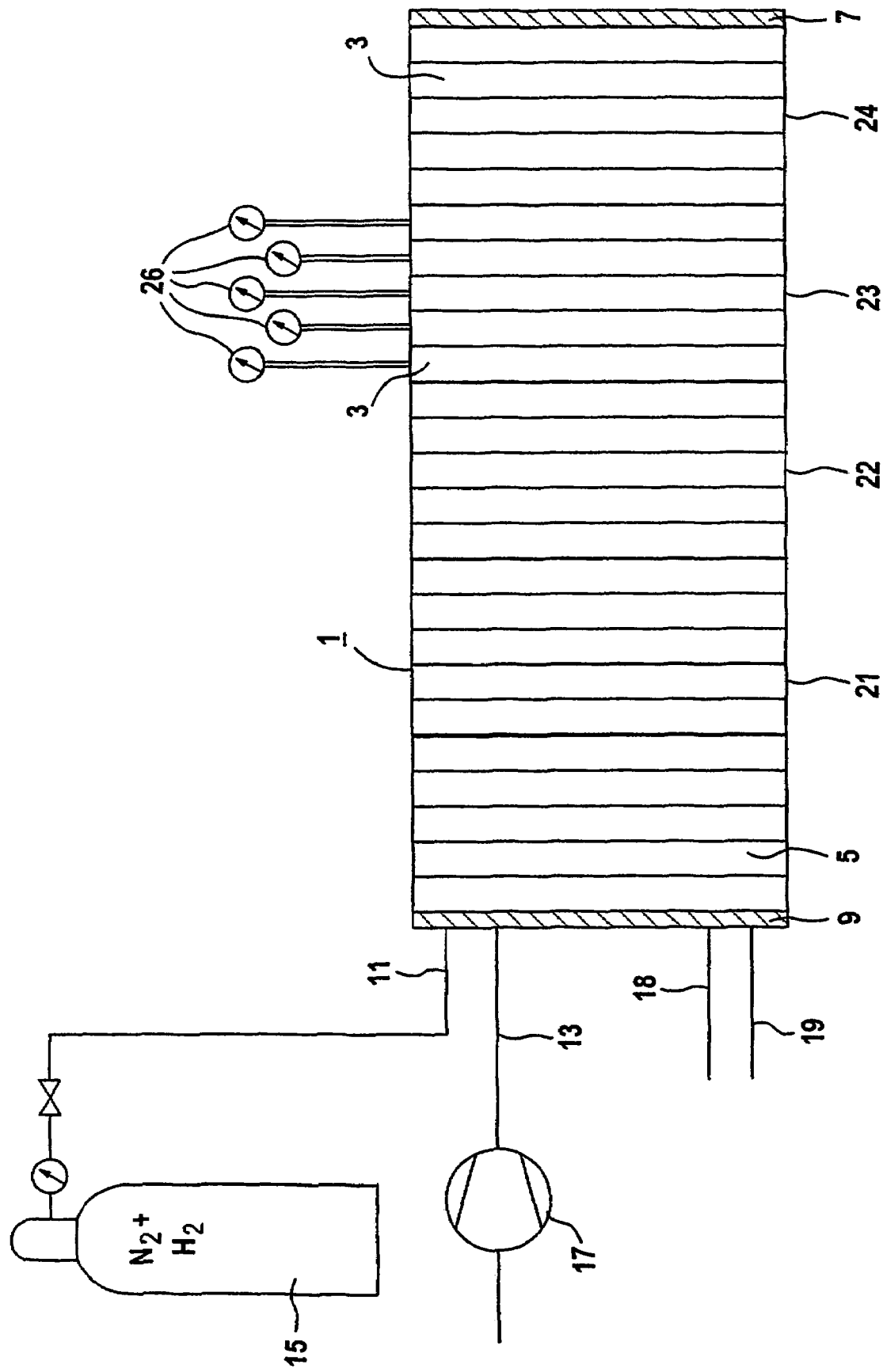

METHOD FOR RECOGNITION OF A LEAK IN A FUEL CELL

This application is the national phase under 35 U.S.C. § 371 of PCT International Application No. PCT/DE01/04453 which has an International filing date of Nov. 27, 2001, which designated the United States of America and which claims priority on German Patent Application number DE 100 60 626.1 filed Dec. 6, 2000, the entire contents of which are hereby incorporated herein by reference.

FIELD OF THE INVENTION

The invention generally relates to a method for detecting a leak in a fuel cell.

BACKGROUND OF THE INVENTION

In a fuel cell, electrical energy and heat are generated as a result of hydrogen ($H_2$) and oxygen ($O_2$) being combined in an electrochemical reaction. For this purpose, hydrogen and oxygen are fed to the fuel cell either in their pure forms or as hydrogen-containing first operating gas and as oxygen-containing second operating gas. While the fuel cell is operating, the hydrogen-containing first operating gas is passed into the anode gas space of the fuel cell, the hydrogen penetrating through the porous anode of the fuel cell and thereby reaching the electrolyte of the fuel cell.

In the same way, the oxygen-containing second operating gas is passed into the cathode gas space of the fuel cell, the oxygen penetrates through the porous cathode of the fuel cell and likewise reaches the electrolyte of the fuel cell. Depending on the design of the electrolyte, either hydrogen ions or oxygen ions penetrate through the electrolyte, so that on one side of the electrolyte oxygen and hydrogen combine in an electrochemical reaction to form water ($H_2O$), with electrical energy and heat being released.

The anode, the electrolyte and the cathode of the fuel cell form a membrane, which like a wall separates the anode gas space from the cathode gas space of the fuel cell. If this membrane has a leak, for example in the form of a hole, while the fuel cell is operating, by way of example, oxygen flows uncontrollably into the hydrogen-containing anode gas space. This leads to an uncontrolled reaction between hydrogen and oxygen in the anode gas space, which may form so much heat that the fuel cell is destroyed. Therefore, during production of the fuel cell it must at all costs be ensured that the membrane-like wall between the anode gas space and the cathode gas space does not have any leaks.

To discover leaks in the membrane of fuel cells, the fuel cells are subjected to a leak test before being delivered. In this context, it is efficient for a multiplicity of fuel cells to be combined to form a fuel cell module and to be tested together. The fuel cell module includes the fuel cell block which includes the cells as well as supply units and in particular a safety device which ensure that, in the event of an uncontrolled reaction between hydrogen and oxygen in a fuel cell, the fuel cell block is switched off in order to prevent the module from being destroyed.

If a leak is detected in a cell of a module, the fuel cell block which includes the fuel cell has to be removed from the module and dismantled, so that the damaged cell can be removed or exchanged. This is a highly complex method, since the module which has already been fully assembled has to be taken apart again. The significantly less complex variant of carrying out the leak test method on the "naked" fuel cell block without safety means is very risky, since in the event of a leak it is impossible to detect and suppress an uncontrolled reaction in a fuel cell. This can lead to substantial destruction within the fuel cell module.

SUMMARY OF THE INVENTION

An object of an embodiment of the present invention is to provide a method for detecting a leak in a fuel cell which can be carried out without risk of destruction of the fuel cell, even on a fuel cell which is not connected to a safety device for monitoring for an uncontrolled reaction.

An object may be achieved by a method for detecting a leak in a fuel cell, in which, according to an embodiment of the invention, the anode gas space of the fuel cell is acted on by a first test gas and the cathode gas space of the fuel cell is acted on by a second test gas. Further, the cell voltage of the fuel cell is measured and the temporal profile of the cell voltage monitored. The first test gas selected is a gas with a hydrogen content of from 0.1 to 15% by volume and the second test gas selected is a gas with an oxygen content of from 0.1 to 30% by volume.

The two test gases which reach the electrolyte effect a cell voltage which, in the absence of an electric load on the fuel cell, reaches the maximum value which the fuel cell can attain. If there is a leak in the membrane, one of the test gases, for example the hydrogen-containing first test gas, penetrates into the cathode gas space of the leaking fuel cell. There, the combination of hydrogen and oxygen not only leads to an uncontrolled reaction which generates heat, but also sees the first test gas displace the oxygen-containing test gas from the cathode.

Since ever decreasing amounts of oxygen are able to reach the electrolyte, the electrochemical reaction taking place at the electrolyte is constantly diminishing. A result is that the cell voltage in the faulty cell drops. The drop in a cell voltage is an indicator of a leak in the membrane of the fuel cell. Therefore, a leak in the membrane of a cell can be detected by the drop in the cell voltage with the aid of measurement of the cell voltages of the cells of a module and the monitoring of the cell voltage with regard to its profile over the course of time.

During a leak test method for a fuel cell, it must be ensured that it is impossible for an ignitable gas mixture to form in any of the gas spaces. An ignitable gas mixture is formed, for example, if more than 5% of hydrogen is introduced in air at room temperature. If the hydrogen content in an air-like gas mixture drops below 5%, the risk of spontaneous ignition at a temperature of from room temperature to approximately 100° C. is low.

Therefore, in the case of a leak test method for a fuel cell without a safety device, it should be ensured that only small quantities of hydrogen can reach a gas with a higher oxygen content or only small quantities of oxygen can reach a gas with a higher hydrogen content. For example, if a first test gas including 15% of hydrogen and 85% of nitrogen flows into the cathode gas space to reach a second test gas with a higher oxygen content—for example air—the hydrogen content is then diluted there to a percentage which is dependent on the magnitude of the leak.

In tests, it has emerged that if a first operating gas containing less than 20% of hydrogen and a second operating gas containing less than 30% of oxygen are used under standard conditions, an ignitable mixture is not formed in the anode or cathode gas space of the fuel cell. The use of a first operating gas containing less than 15% of hydrogen and of a second operating gas containing less than 25% of oxygen increases the safety with respect to the possibility of destructive heat being formed in the fuel cell to a considerable extent compared to standard conditions.

Although, in the event of a leak in the membrane, the hydrogen and the oxygen do react in an uncontrolled, heat-generating reaction to form water, this reaction takes place so slowly that the heat which is produced can be dissipated from the fuel cell without damage to the fuel cell. This ensures that the fuel cell can be tested for a leak in its membrane without any risk of the fuel cell being destroyed.

In an advantageous configuration of an embodiment of the invention, the hydrogen content of the first test gas added to the oxygen content of the second test gas amounts to no more than 35% by volume. Therefore, if, for example, the second test gas used is air with an oxygen content of 21% by volume, the content by volume of hydrogen in the first test gas is no more than 14% by volume. If, in a second example, a first test gas with a hydrogen content of 20% by volume is used, the content by volume of oxygen in the second test gas is no more than 15% by volume. These test gases ensure that even in the event of irregularities in the test conditions, such as for example a particularly major leak in a membrane of a fuel cell or fuel cell temperatures of around or slightly over 100° C., there is no ignitable gas mixture formed in the fuel cell.

During the measurement of the cell voltage, the fuel cell is expediently continuously flushed with the test gases. It is thereby ensured that the first, hydrogen-containing test gas flows continuously through the anode gas space or the second, oxygen-containing test gas flows continuously through the cathode gas space. In the event of a leak in the membrane of the fuel cell, one of the test gases flows out of a gas space into the other gas space of the fuel cell and blocks access of the other test gas to the region around the leak in the membrane.

As a result, the cell voltage of the fuel cell drops or does not reach the level which fuel cells of the same type without the leak reach. Since the gas spaces of the fuel cell are continuously purged with the associated test gases, the flow of a test gas from one gas space into the other does not end. This ensures that the cell voltage of a fuel cell which has a leak in the membrane does not rise to the usual cell voltage level for as long as the gas spaces are being purged with test gases. The indicator of a leak in the membrane, namely the ongoing low cell voltage of the fuel cell, is therefore retained for a prolonged period of time. The result of this is that any "distorting effects" which lead to a temporary drop in the cell voltage of a fuel cell can be unambiguously distinguished from a drop in the cell voltage of a fuel cell which is caused by a leak in the membrane.

In an alternative configuration of an embodiment of the invention, first of all one gas space of the fuel cell is acted on by one of the test gases. Then, the other gas space is acted on by the other test gas, wherein the latter test gas is not renewed in the fuel cell during the measurement of the cell voltage. The latter gas space is advantageously evacuated before it is acted on by the other test gas.

In the event of a defective fuel cell whose membrane has a leak, one test gas, for example the hydrogen-containing first test gas, flows from the anode gas space into the— optionally evacuated—cathode gas space. Therefore, hydrogen-containing first test gas is present at the anode and at the cathode, with the result that it is impossible for a cell voltage to form. When the second test gas flows into the cathode gas space, the cathode of the fuel cell is completely occupied by hydrogen-containing first test gas. Since the second test gas cannot reach the cathode of the fuel cell, even at this point it is impossible for a cell voltage to form.

The fuel cell only shows a cell voltage when fractions of the first test gas have been consumed by the oxygen of the second test gas in the cathode gas space in a heat-generating reaction. A cell voltage is only built up when oxygen from the second test gas is able to reach the cathode of the fuel cell. However, since the continuous flushing of the anode gas space with first test gas constantly forces this first test gas through the leak in the membrane into the cathode gas space, the oxygen from the second test gas will be consumed after a while. At this time, the cell voltage of the fuel cell will have dropped all the way to zero. A defective fuel cell is therefore distinguished by a cell voltage which initially rises only slightly and then disappears altogether, and can therefore be identified as defective.

In a further advantageous configuration of an embodiment of the invention, during the measurement of the cell voltage one of the gas spaces is acted on by a greater test gas pressure than the other gas space. The result of this is that the test gas which is introduced at the greater gas pressure, in the event of a leak in the membrane, in any event flows through the leak in the membrane into the other gas space, thereby causing the cell voltage to drop.

It is expedient for the water to be drained out of at least one of the gas spaces before the cell voltage is measured. Under certain circumstances, during the test method product water from the electrochemical reaction will collect in the fuel cell. If humidified test gases are additionally applied to the fuel cell, it is possible that condensed humidification water may also collect in the fuel cell. This water will occupy some of the membrane, with the result that the cell voltage of the fuel cell is dependent on the water located therein. Therefore, a relatively large quantity of water in the fuel cell, in the same way as a leak in the membrane, leads to a drop in the cell voltage. This test error is avoided by the water being drained out of the fuel cell before the cell voltage is measured.

In a further expedient configuration of the invention, the method is applied to a planar fuel cell in a fuel cell block which includes a multiplicity of planar fuel cells. For this purpose, all the fuel cells of the fuel cell block are acted on by the test gases and the cell voltage of the fuel cells is monitored.

The fuel cell block is, for example, composed only of the stacked fuel cells which are sealed off from one another, a front plate and an end plate and if appropriate a humidifier, if required, without any supply and monitoring devices. The block can be supplied with the test gases, and the cell voltages monitored, manually and by simple devices. If, at this very early assembly stage of the fuel cell block, it emerges that a fuel cell is defective, the fuel cell block can be dismantled without major outlay and the defective fuel cell replaced.

An abovementioned object of an embodiment of the invention may also be achieved by a method for detecting a leak in a fuel cell in which, instead of the cell voltage of an individual fuel cell, the group cell voltage of a group of fuel cells connected in series is measured and its temporal profile monitored. In this case, the fuel cell block is divided into a number of fuel cell groups and the voltage of each of these groups is monitored. If the group cell voltage of a group is below the standard cell voltage multiplied by the number of the fuel cells in the group, this is an indication that there is a damaged fuel cell within the group. Then, in a second test step, this group can be investigated in greater detail by, for example, being divided into subgroups or by the cell voltage of each individual cell of this group being checked. The result of this method is that in the case of a fuel cell block which comprises a very large number of fuel cells, it is not necessary for the cell voltage of each individual fuel cell to be monitored yet nevertheless a defective fuel cell can be identified very easily and reliably.

BRIEF DESCRIPTION OF THE DRAWINGS

An exemplary embodiment of the invention is explained in more detail on the basis of a drawing, which comprises a single FIGURE.

FIG. 1 shows a fuel cell block including a plurality of fuel cells and a humidifier.

DETAILED DESCRIPTION OF THE PREFERRED EMBODIMENTS

FIG. 1 shows a fuel cell block 1 which includes a plurality of fuel cells 3 and a humidifier 5 which includes five cells. The fuel cell block 1 is delimited by a back plate 7 and a front plate 9, to which a first line 11 for supplying first test gas to the fuel cell block 1 and a second line 13 for supplying a second test gas to the fuel cell block 1 are connected. The first line 11 is connected to a gas cylinder 15 which contains the first test gas. The first test gas contains 5% of hydrogen and 95% of nitrogen. The second line 13 is connected to an air compressor 17. Moreover, the anode exhaust-gas line 18 and the cathode exhaust-gas line 19 of the fuel cell block 1 are fitted to the front plate 9.

The fuel cell block 1 is arbitrarily divided into, for example, four fuel cell groups, namely a first fuel cell group 21, a second fuel cell group 22, a third fuel cell group 23 and a fourth fuel cell group 24. This division is not limitative of the present invention. Each of these four fuel cell groups 21 to 24 includes, for example, five fuel cells 3.

In a first leak test method, the first test gas and air as second test gas are fed to the fuel cell block 1 and therefore to all the fuel cells 3, with the group cell voltages of the four fuel cell groups 21 to 24 being measured and monitored with regard to their profile over the course of time. The fuel cells 3 of the fuel cell block 1 are preferably continuously flushed with the two test gases during the measurement of the cell voltage. Moreover, the cathode gas spaces of the fuel cells 3 of the fuel cell block 1 are preferably acted on by a pressure which is approximately 0.1 bar greater than the anode gas spaces of the fuel cells 3 of the fuel cell block 1.

As an example, the group cell voltages of the fuel cell groups 21, 22 and 24 are in each case 5 V, which approximately corresponds to five times the normal cell voltage of an intact fuel cell without an electric load connected. By contrast, the group cell voltage of the fuel cell group 23 are only 4.2 V. It is therefore apparent that the fuel cells 3 of the fuel cell groups 21, 22 and 24 do not have any leaks in their membranes, whereas the lower group cell voltage of the fuel cell group 23 is an indication that there is a defective fuel cell in the fuel cell group 23.

In a second leak test method, the fuel cell group 23 is tested separately by each of its five fuel cells being connected to a cell voltage-measuring appliance 26. Before the cell voltage is measured, the water is drained from the cathode gas spaces of the fuel cells 3 of the fuel cell group 23, since product water has collected in these fuel cells during the first measurement. Then, the cathode gas space of the fuel cells 3 of the fuel cell group 23 is acted on and continuously purged by a first test gas, whereas the anode gas space of the fuel cells 3 of this group is evacuated.

After the evacuation, the anode gas spaces are filled with the second, hydrogen-containing test gas, the anode gas, but the anode gas discharge line 18 of the fuel cell block 1 is closed. The cell voltage of the five fuel cells 3 of the fuel cell group 23 is measured and its profile over the course of time monitored, which revealed that in the middle one of the five fuel cells 3 of the fuel cell group 23 the cell voltage rose only briefly before collapsing after a short time. This temporal profile of the cell voltage is an indication that the first and hydrogen-containing test gas only reaches the anode of the middle fuel cell 3 after a delay and for a short time and in small quantities. It can be assumed that the membrane of the middle fuel cell 3 of the fuel cell group 23 has a leak.

Before the fuel cell block 1 is assembled with supply and monitoring devices to form a fuel cell module. Therefore, the middle fuel cell 3 of the fuel cell group 23 has to be replaced. However, since the fuel cell block 1 is still completely "naked" and has not yet been integrated in the module, exchanging the faulty fuel cell 3 is a relatively simple undertaking.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for detecting a leak in a fuel cell, comprising:
    flushing a constant supply of a first test gas in and out of an anode gas space of the fuel cell and a constant supply of a second test gas in and out of a cathode gas space of the fuel cell, the first test gas being a gas with a hydrogen content from 0.1 to 20% by volume and the second test gas being a gas with an oxygen content from 0.1 to 30% by volume;
    measuring a cell voltage of the fuel cell during the flushing of at least one of the anode gas space and the cathode gas space, while the fuel cell is in operation; and
    monitoring a temporal profile of the cell voltage,
    wherein the hydrogen content of the first test gas added to the oxygen content of the second test gas amounts to no more than 35% by volume, and further wherein no ignitable gas mixture is formed when the leak or irregularities occur in the fuel cell.

2. The method as claimed in claim 1, wherein, during the measurement of the cell voltage, one of the gas spaces is acted on by a greater test gas pressure than the other gas space.

3. The method as claimed in claim 1, wherein water is drained out of at least one of the gas spaces before the cell voltage is measured.

4. The method as claimed in claim 1, wherein the method is applied to a planar fuel cell in a fuel cell block including a plurality of planar fuel cells.

5. The method as claimed in claim 4, wherein a group cell voltage of a group of fuel cells connected in series is measured and monitored in temporal profile.

6. The method of claim 1, wherein a leak is detectable based upon at least one of the measuring and monitoring.

7. The method as claimed in claim 1, wherein the hydrogen content is 15-20%; and the oxygen content is 15-25%.

8. A method for detecting a leak in a fuel cell, comprising:
    measuring a cell voltage of the fuel cell in operation; and
    monitoring a temporal profile of the cell voltage, wherein during the measuring and monitoring, the following occurs:
    (a) a constant supply of a first test gas is continuously fed in and out of an anode gas space of the fuel cell in operation. the first test gas being a gas with a hydrogen content from 0.1 to 20% by volume, and (b) a constant supply of a second test gas is continuously fed in and out of a cathode gas space of the fuel cell, the second test gas being a gas with an oxygen content from 0.1 to 30% by volume.

wherein the hydrogen content of the first test gas added to the oxygen content of the second test gas, amounts to no more than 35% by volume, and further wherein no ignitable gas mixture is formed when the leak or irregularities occur in the fuel cell.

9. The method of claim 8, wherein a leak is detectable based upon at least one of the measuring and monitoring.

10. The method as claimed in claim 8, wherein, during the measurement of the cell voltage, one of the gas spaces is fed with a greater test gas pressure than the other gas space.

11. The method as claimed in claim 8, wherein water is drained out of at least one of the gas spaces before the cell voltage is measured.

12. The method as claimed in claim 8, wherein the hydrogen content is 15-20%; and the oxygen content is 15-25%.

* * * * *